(12) United States Patent
Lein et al.

(10) Patent No.: US 6,761,388 B2
(45) Date of Patent: Jul. 13, 2004

(54) CONSOLE SYSTEM HAVING A DOUBLE-HINGED LID

(75) Inventors: Julie Lein, Livonia, MI (US); Mangesh Soman, Northville, MI (US)

(73) Assignee: Plastech Engineered Products, Dearborn, MI (US)

( * ) Notice: Subject to any disclaimer, the term of this patent is extended or adjusted under 35 U.S.C. 154(b) by 0 days.

(21) Appl. No.: 10/338,596

(22) Filed: Jan. 8, 2003

(65) Prior Publication Data

US 2003/0155787 A1 Aug. 21, 2003

Related U.S. Application Data

(60) Provisional application No. 60/347,075, filed on Jan. 8, 2002.

(51) Int. Cl.[7] .............................................. B60R 27/00
(52) U.S. Cl. ................................. 296/24.34; 296/37.8
(58) Field of Search ............................. 276/37.1, 37.5, 276/37.8, 1.09, 24.3, 24.33, 24.34, 24.4, 24.1; 220/326, 844; 224/282; 16/232; 49/193; 297/115; 312/324

(56) References Cited

U.S. PATENT DOCUMENTS

| | | | | |
|---|---|---|---|---|
| 3,022,107 A | | 2/1962 | Daniels ........................ 296/37 |
| 3,338,629 A | * | 8/1967 | Drees | |
| 3,356,409 A | | 12/1967 | Belsky et al. .................. 296/24 |
| 4,106,829 A | * | 8/1978 | Dolle et al. ............. 312/235 A |
| 4,655,499 A | * | 4/1987 | Piper ............................ 16/232 |
| 4,719,665 A | * | 1/1988 | Bell ............................. 16/232 |
| 4,809,897 A | | 3/1989 | Wright, Jr. ................... 224/282 |
| 4,848,627 A | * | 7/1989 | Maeda et al. ................ 224/275 |
| 4,934,750 A | | 6/1990 | Eichler et al. .............. 296/37.8 |
| 4,986,589 A | * | 1/1991 | McNew ...................... 296/37.8 |
| 5,067,625 A | | 11/1991 | Numata ....................... 220/343 |
| 5,076,641 A | | 12/1991 | Lindberg ..................... 297/194 |
| 5,144,720 A | | 9/1992 | Aihara et al. ................. 16/232 |
| 5,173,992 A | | 12/1992 | Aihara et al. ................. 16/232 |
| 5,195,272 A | | 3/1993 | Yamada ........................ 49/193 |
| 5,209,016 A | | 5/1993 | Yamada ........................ 49/193 |
| 5,210,906 A | | 5/1993 | Aihara et al. ................. 16/232 |
| 5,212,849 A | | 5/1993 | Aihara ......................... 16/232 |
| 5,246,151 A | * | 9/1993 | Jabara ...................... 224/42.42 |
| 5,357,652 A | | 10/1994 | Yamada ........................ 16/232 |
| 5,390,976 A | | 2/1995 | Doughty et al. ............. 297/115 |
| 5,551,755 A | * | 9/1996 | Lindberg ................ 297/411.46 |
| 5,647,652 A | | 7/1997 | Zalewski et al. ........... 312/324 |
| 5,904,389 A | * | 5/1999 | Vaishnav et al. ........... 296/37.1 |
| 6,003,716 A | | 12/1999 | Allison et al. .............. 220/326 |
| 6,116,674 A | | 9/2000 | Allison et al. ............. 296/37.8 |
| 6,129,400 A | * | 10/2000 | Jakubiec et al. .......... 296/37.14 |
| 6,142,333 A | | 11/2000 | Sasamoto et al. ........... 220/264 |
| 6,206,260 B1 | * | 3/2001 | Covell et al. ................ 224/539 |
| 6,250,729 B1 | | 6/2001 | Allison et al. .............. 312/324 |
| 6,422,440 B1 | * | 7/2002 | Stone ....................... 296/37.15 |
| 6,588,821 B2 | * | 7/2003 | Worrell et al. ............. 296/37.8 |
| 6,616,206 B2 | * | 9/2003 | Luginbill et al. ........... 296/37.8 |
| 2002/0163215 A1 | * | 11/2002 | Emerling et al. .......... 296/24.1 |

FOREIGN PATENT DOCUMENTS

| | | | | | |
|---|---|---|---|---|---|
| JP | | 405112181 A | * | 5/1993 | ................. 296/37.8 |
| JP | | 405139199 A | * | 6/1993 | ................. 296/37.8 |

* cited by examiner

*Primary Examiner*—D. Glenn Dayoan
*Assistant Examiner*—H. Gutman
(74) *Attorney, Agent, or Firm*—Bliss McGlynn, P.C.

(57) ABSTRACT

A console system for the interior of a motor vehicle includes a console component, a plate, and a lid. The console component defines a housing having an interior with an opening and a longitudinal axis. The plate has first and second ends and is supported on the console component and pivotably movable at the first end of the plate relative to the console component between a first position, wherein the plate covers the opening of the console component, and a second position, wherein the plate is spaced from the opening to allow access to the interior of the console component. The lid has a cover and an inner surface and is supported by the plate and pivotably movable at the second end of the plate between a first position, wherein the inner surface of the lid is juxtaposed the plate, and a second position, wherein the inner surface is spaced from the plate such that the inner surface and the plate define a co-extensive, substantially planar surface along the longitudinal axis of the console component.

17 Claims, 9 Drawing Sheets

CONSOLE SYSTEM HAVING A DOUBLE-HINGED LID

This application claims the benefit of U.S. Provisional Application No. 60/347,075, filed Jan. 8, 2002.

BACKGROUND OF THE INVENTION

1. Field of the Invention

The present invention relates, in general, to a console system for a motor vehicle and, in particular, to a console system having a double-hinged lid that can selectively rotate in two opposed directions.

2. Description of the Related Art

Most modem motor vehicles, especially those equipped with front bucket seats, have a center console system typically mounted between the front seats. The console system typically includes a console component that is essentially a receptacle having an open end. The console component is typically mounted to interior surfaces of the motor vehicle. The console system also typically includes a generally rectangular lid that is typically hingedly mounted to a surface of the console component. Optional components, such as a selectively operable cup holder and/or coin compartment, can also be incorporated into the console system.

The lid typically includes a padded upper portion covered with an aesthetically pleasing covering, such as vinyl or leather, that presents a "class A" surface. The profile of the upper surface of the lid is typically rounded or curved such that placing and retaining objects thereon is difficult in that the objects have a tendency to slide and eventually fall off the upper surface. This is especially true for elongated cargo items—such as skis, wooden planks, and metal strips—that are placed in the trunk and then through an opening in the rear-seat wall and come to rest upon the lid of the console system. Because these items are typically heavy and have non-rounded edges, they may easily shift during travel and fall off conventional lids and potentially injure the driver and/or other occupants of the motor vehicle.

If the hinge mounting connects an end surface (either front or rear) of the lid to an end surface (either front or rear) of the console component, the lid can only rotate in one principal direction, i.e., up and down in a relatively high-arcing direction. In this manner, access to the interior of the console component is achieved. Conversely, if the hinge mounting connects a side surface (either left or right) of the lid to a side surface (either left or right) of the console component, the lid can only rotate in one principal direction, i.e., up and down in a relatively low-arcing direction and generally perpendicular to the previously described high-arcing direction. In this manner, access to the interior of the console component is achieved.

In both cases, when the lid is rotated, the open end of the console component is exposed. Therefore, if a flat, continuous surface is desired for any reason, it is generally necessary to rotate the lid back to its "closed" position to cover the exposed end of the console component. However, with the space and weight constraints of modem motor vehicles, the length and overall surface area of the lid of the center console does not function effectively as either an armrest or as a substantially flat and elongated surface for placing various items thereupon.

Therefore, there still exists a need in the related art for a console system that is capable of permitting the lid to be variably positioned to permit access to the interior of the console component as well as provide a substantially flat and elongated surface for placing various items thereupon.

SUMMARY OF THE INVENTION

The present invention overcomes the disadvantages in the related art in a console system for the interior of a motor vehicle that includes a console component, a plate, and a lid. The console component defines a housing having an interior with an opening and a longitudinal axis. The plate has first and second ends and is supported on the console component and pivotably movable at the first end of the plate relative to the console component between a first position, wherein the plate covers the opening of the console component, and a second position, wherein the plate is spaced from the opening to allow access to the interior of the console component. The lid has a cover and an inner surface and is supported by the plate and pivotably movable at the second end of the plate between a first position, wherein the inner surface of the lid is juxtaposed the plate, and a second position, wherein the inner surface is spaced from the plate such that the inner surface and the plate define a co-extensive, substantially planar surface along the longitudinal axis of the console component.

One advantage of the console system of the present invention is that the lid can be selectively positioned to provide a substantially flat and elongated surface for placing various items thereon.

Another advantage of the console system of the present invention is that while the lid is positioned to provide a substantially flat and elongated surface for placing various items thereon, the plate serves to simultaneously prevent access to the interior of the console component.

Another advantage of the console system of the present invention is that the plate can be selectively positioned to provide access to an interior of the console component.

Another advantage of the console system of the present invention is that a portion of a bottom surface of the console component can be provided with an appendage that is adapted to engage a surface of the motor vehicle to secure that portion of the console component to that surface of the motor vehicle without need for any fastening devices.

Other objects, features, and advantages of the present invention will be readily appreciated as the same becomes better understood while reading the subsequent description taken in conjunction with the accompanying drawings.

DETAILED DESCRIPTION OF THE PRESENT INVENTION

Figure 1:
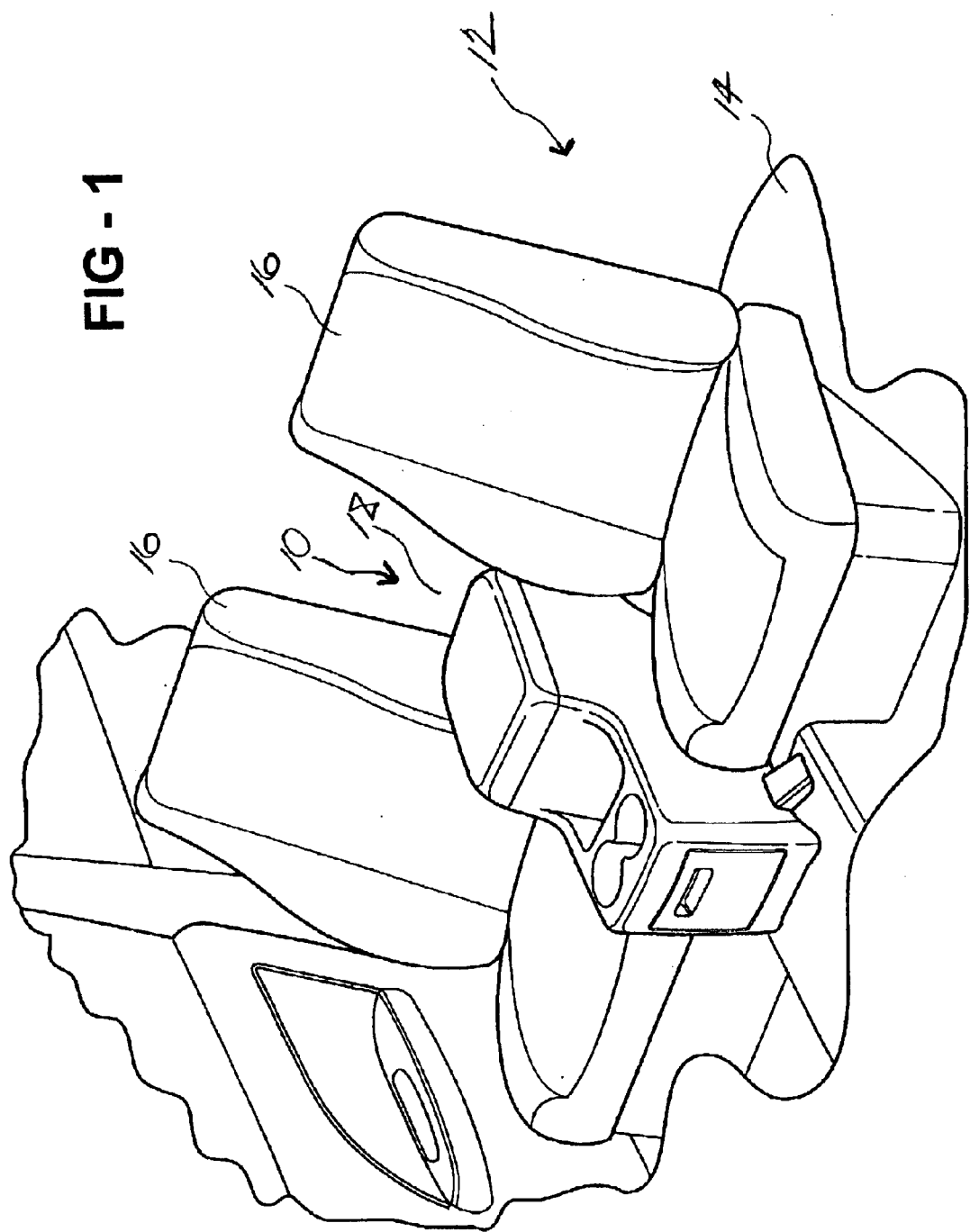
FIG. 1 is an environmental view of the console system of the present invention.

Referring now to the figures, where like numerals are used to designate like structure, a console system of the present invention is generally indicated at 10. In FIG. 1, the console system 10 is shown employed in an interior compartment, generally indicated at 12, of a motor vehicle. The interior compartment 12 includes a floor 14 and is equipped with a pair of front bucket seats 16 mounted to the floor and defining a space 18 between the seats 16. The console system 10 is shown mounted to the floor 14 within the space 18 and substantially between the seats 16. However, from the description that follows, those having ordinary skill in the art will appreciate that the console system 10 may be employed in any convenient place in a motor-vehicle context. More specifically, the location of the console system 10 is not limited to positions between or in association with front seats or rear seats or any other specific position within an interior compartment of a motor vehicle.

Figure 5:
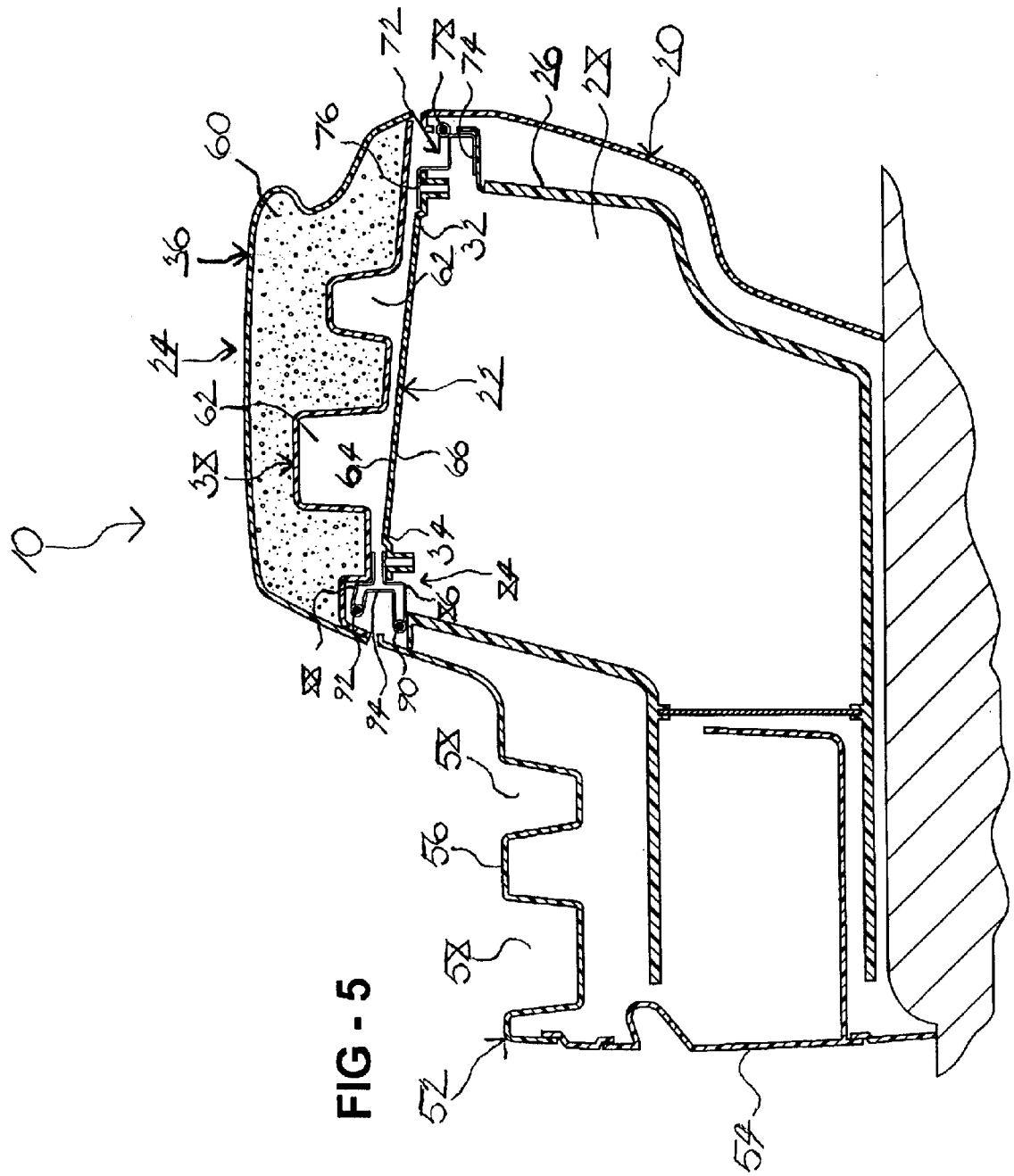
FIG. 5 is a cross-sectional side view of the console system of the present invention showing the console component in a closed disposition.
Figure 6:
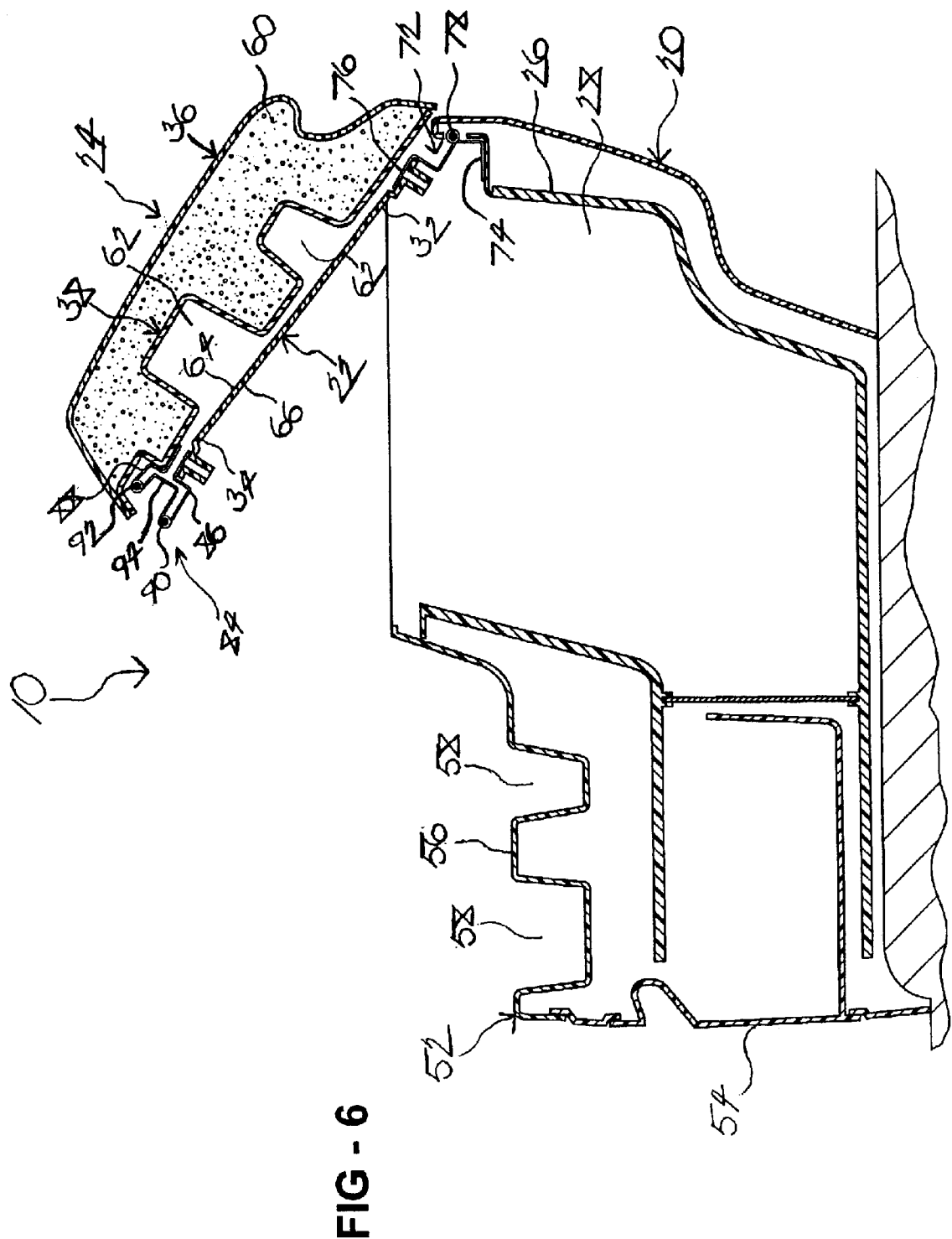
FIG. 6 is a cross-sectional side view of the console system of the present invention showing the console component in a partially opened disposition.
Figure 7:
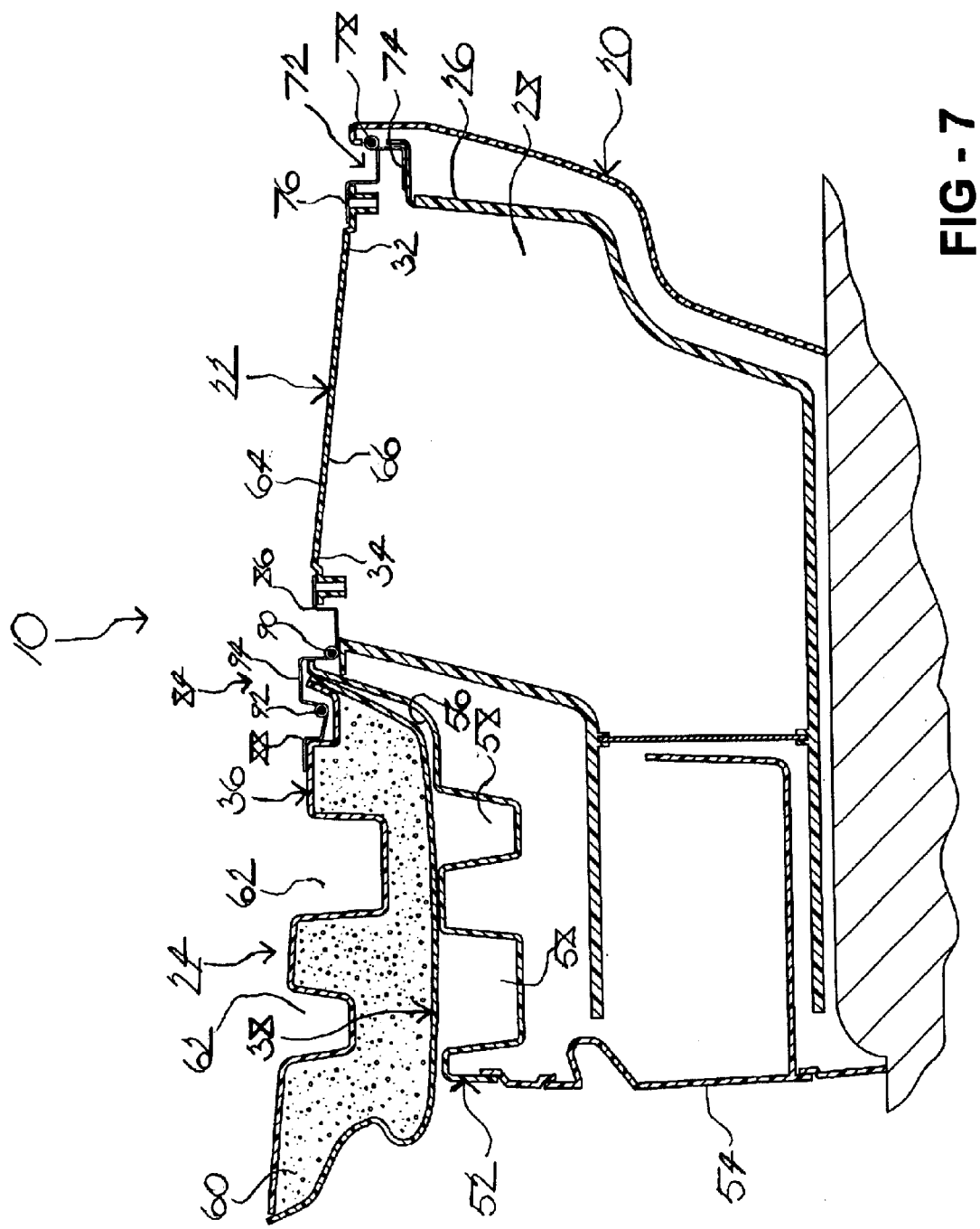
FIG. 7 is a cross-sectional side view of the console system of the present invention showing the console component in a closed disposition and the inner surface of the lid and the plate defining a co-extensive, substantially planar surface.

As shown in FIGS. 2, 3, 5, 6, 7, and 10, the console system 10 primarily includes a console component, generally indicated at 20, a plate, generally indicated at 22, and a lid, generally indicated at 24. In general, the console component 20 defines a housing, generally indicated at 26, having an interior 28 with an opening 30 and a longitudinal axis "A". The plate 22 has first and second ends 32, 34, respectively, and is supported on the console component 20. The plate 22 is pivotably movable at the first end 32 relative to the console component 20 between a first position, wherein the plate 22 covers the opening 30 of the console component 20 (FIG. 5), and a second position, wherein the plate 22 is spaced from the opening 30 to allow access to the interior 28 of the console component 20 (FIGS. 6 and 7). The lid 24 has a cover, generally indicated at 36, and an inner surface, generally indicated at 38. The lid 24 is supported by the plate 22. The lid 24 is pivotably movable at the second end 34 of the plate 22 between a first position, wherein the inner surface 38 of the lid 24 is juxtaposed the plate 22, and a second position, wherein the inner surface 38 is spaced from the plate 22 such that the inner surface 38 and the plate 22 define a co-extensive, substantially planar surface along the longitudinal axis "A" of the console component 20. Each of the console component 20, plate 22, and lid 24 will now be described in greater detail.

Figure 4:
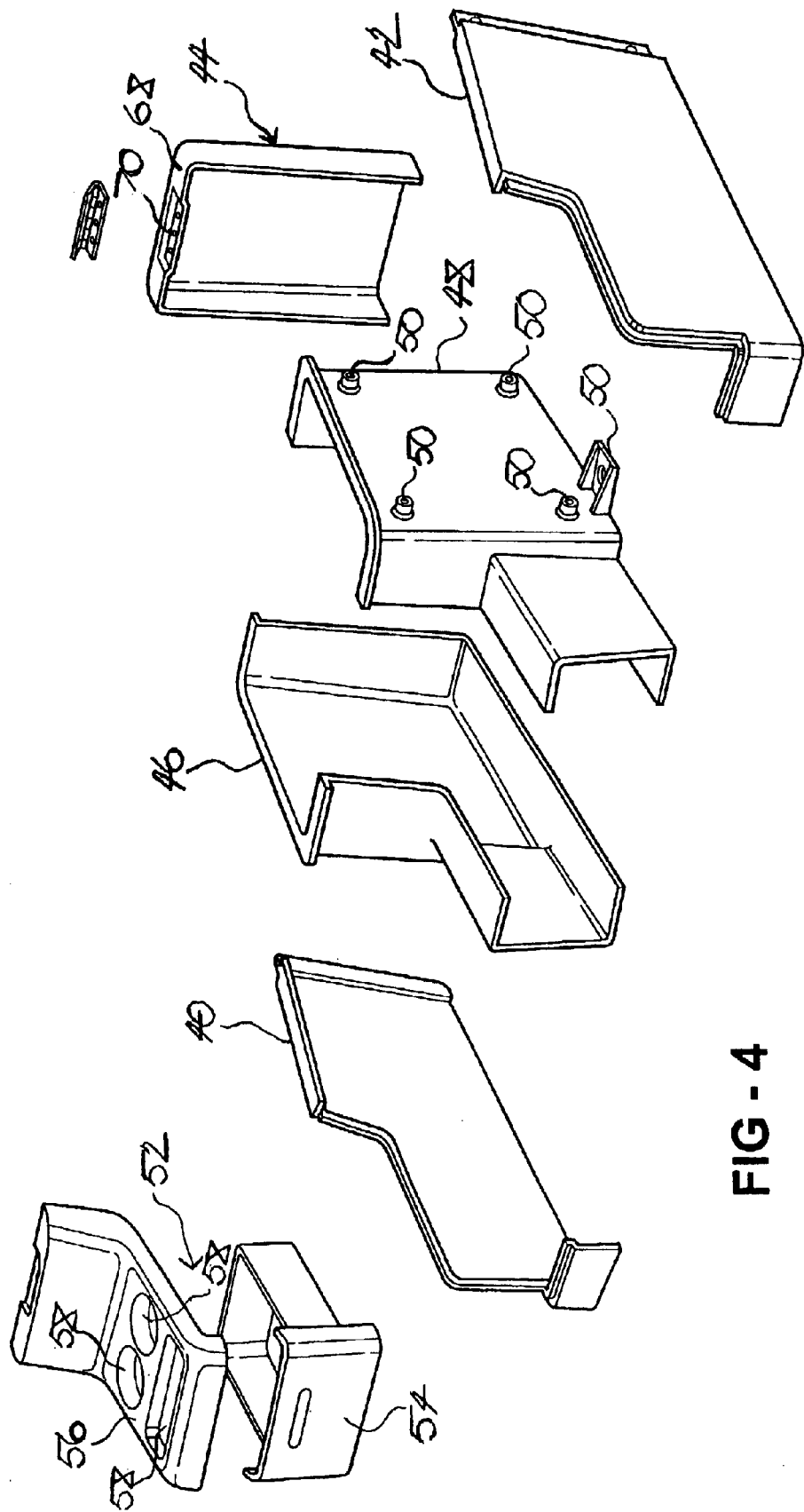
FIG. 4 is an exploded, fragmented view of the console component of the console system of the present invention.

In a preferred embodiment of the console system 10 and as best shown in FIG. 4, the console component 20 may include a right-hand outer shell 40, a left-hand outer shell 42, a back plate, generally indicated at 44, a right-hand inner bin 46, and a left-hand inner bin 48. The right-hand and left-hand outer shells 40, 42, respectively, can be provided with an aesthetically pleasing surface, such as vinyl or leather, to present a "class A" surface and can be colored to match or coordinate with the interior compartment 12 of the motor vehicle. During assembly of the console system 10 within the interior compartment 12 of the motor vehicle, the right-hand and left-hand inner bins 46, 48, respectively, can be easily fastened to various surfaces of the interior compartment 12 with fastening devices, such as screws, bolts, and the like, disposed through various types of mounts 50.

Preferably and as shown in FIGS. 2, 4, 5, 6, 7, and 10, the console component 20 further includes a forward portion, generally indicated at 52, spaced vertically below the opening 30 of the console component 20. The forward portion 52 includes a drawer 54 and a top cover, generally indicated at 56, juxtaposed the drawer 54. The drawer 54 is useful for storing items, such as coins, sunglasses, cellular phones, and the like. The top cover 56 includes at least one receptacle 58, but preferably a plurality of receptacles 58 defined in the top cover 56 for retaining articles therein. The receptacles 58 can include a beverage-holder system and/or a storage slots.

Those having ordinary skill in the art will appreciate that the console component 10 can be constructed of a single system by injection molding, for instance, or from several individual parts, with or without an aesthetically pleasing covering. Those having ordinary skill in the art will also appreciate that the console component 10 can be constructed of any number of suitable materials. However, thermoplastic or thermoset materials are preferred for their relatively low cost, light weight, and durability. Metallic materials may also be used for increased ruggedness.

In a preferred embodiment of the console system 10 and as shown in FIGS. 5, 6, 7, and 10, the lid 24 is of a generally rectangular shape and has a core 60 formed between the cover 36 and the inner surface 38 of the lid 24. Preferably, the core 60 is resiliently deformable, and the cover 36 is aesthetically pleasing and presents a "class A" surface. More preferably, the core 60 is made of foam, and the cover 36 is made of vinyl or leather.

Figure 3:
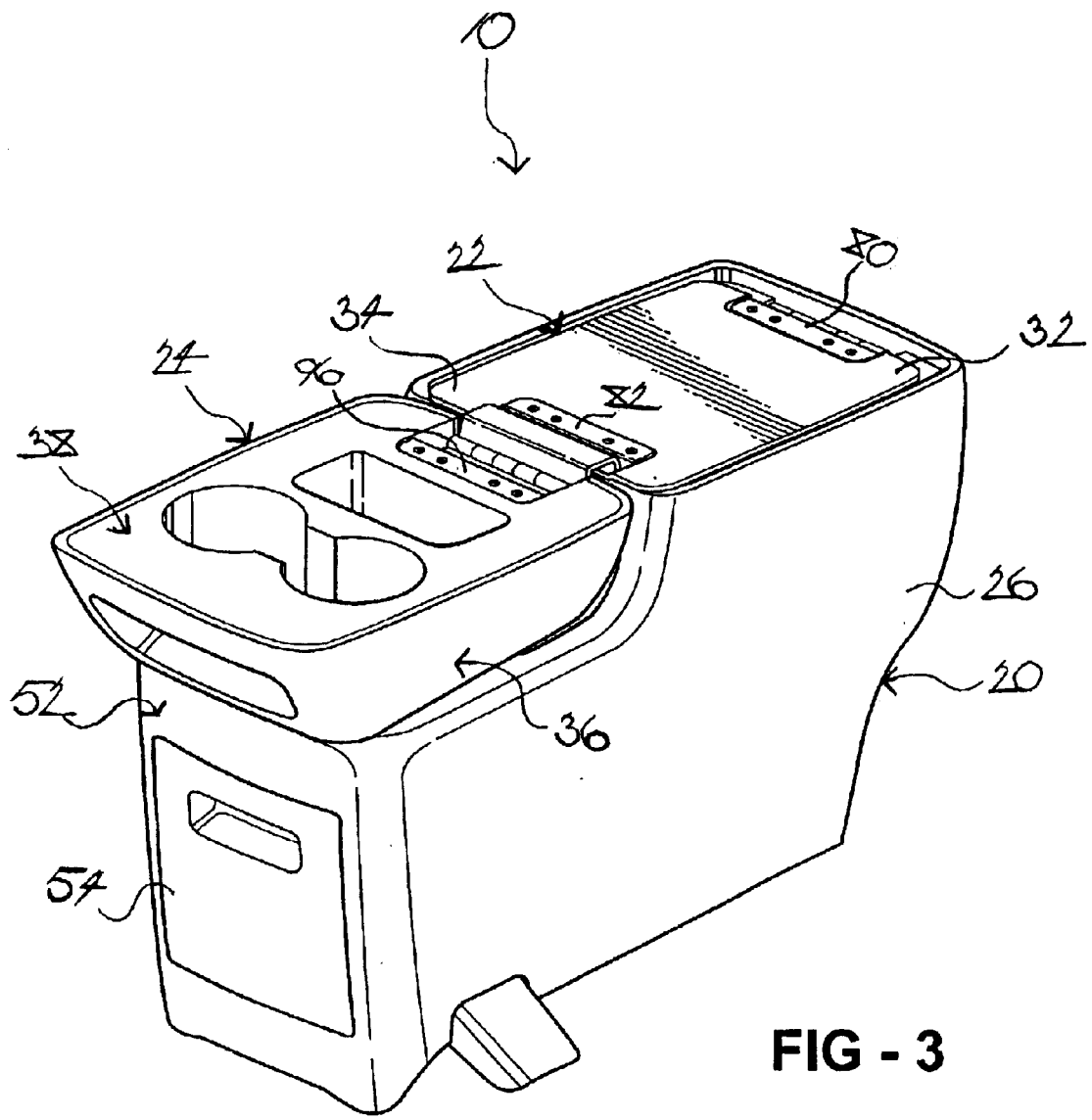
FIG. 3 is a perspective view of the console system of the present invention showing the console component in a closed disposition and the inner surface of the lid and the plate defining a co-extensive, substantially planar surface.
Figure 10:
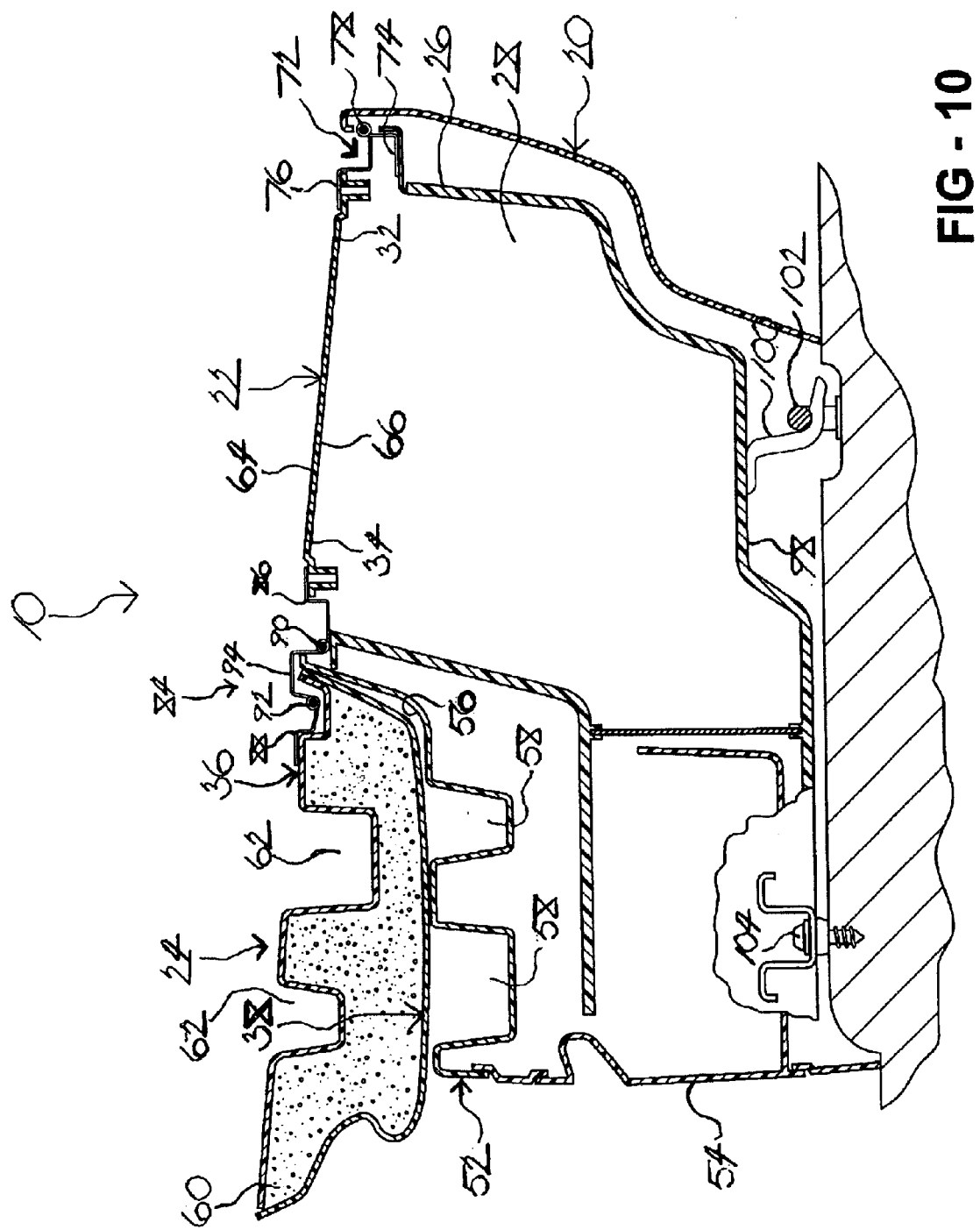
FIG. 10 is a cross-sectional side view of the console system of the present invention showing a portion of a bottom surface of the console component provided with an appendage engaging a surface of the motor vehicle.

Preferably, the inner surface 38 of the lid 24 includes at least one open-ended cavity 62, but preferably a plurality of open-ended cavities 62, defined in the inner surface 38 for accepting and retaining articles when the lid 24 is in the second position. As shown in FIGS. 3, 7, and 10, when the lid 24 is disposed in the second position, the lid 24 is supported by the forward portion 52 of the console component 20. Those having ordinary skill in the art will appreciate that the lid 24 can include several discrete parts.

In a preferred embodiment of the console system 10 and as best shown in FIGS. 5, 6, 7, and 10, the plate 22 is of a substantially rectangular shape and also has a top surface 64 and a bottom surface 66. The first and second ends 32, 34, respectively, of the plate 22 are spaced from and disposed opposite each other. As shown in FIGS. 5, 7, and 10, when the plate 22 is supported on the console component 20 it covers the opening 30 of the console component 20. Those having ordinary skill in the art will appreciate that the plate 22 can be constructed of any number of suitable materials. However, thermoplastic or thermoset materials are preferred for their relatively low cost, light weight, and durability. Metallic materials may also be used for increased ruggedness.

Figure 8:
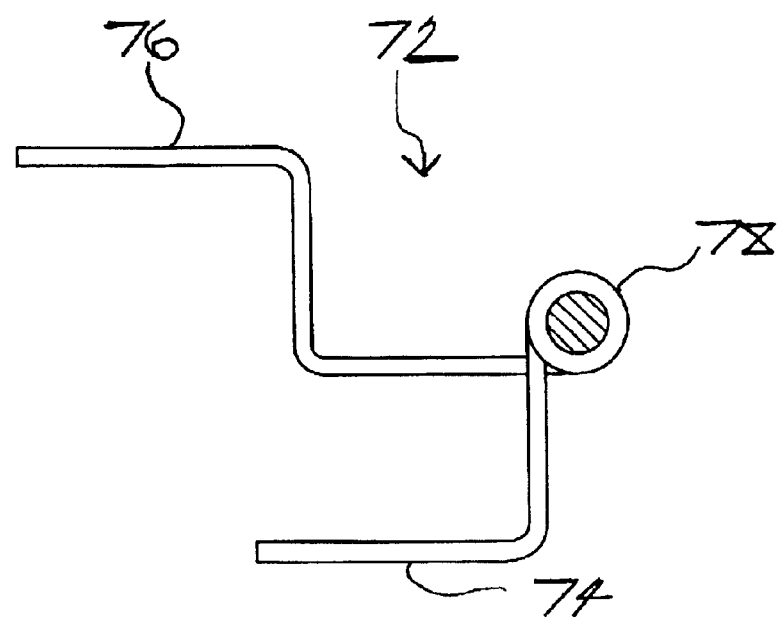
FIG. 8 is an elevational side view of the first hinge of the console system of the present invention.

Preferably, the back plate 44 of the console component 20 includes a top surface 68 that is provided with a mounting area 70, such as a plurality of holes 70, to enable a first hinge, generally indicated at 72 and shown per se in FIG. 8, to be mounted on the top surface 68. More specifically and as shown in FIGS. 5, 6, 7, and 10, the first hinge 72 has a first leg 74 mounted to the top surface 68 of the back plate 44. A second leg 76 is mounted to the first end 32 of the plate 22, and a pivot point 78 operatively connected to the first and second legs 74, 76, respectively, of the first hinge 72.

Figure 2:
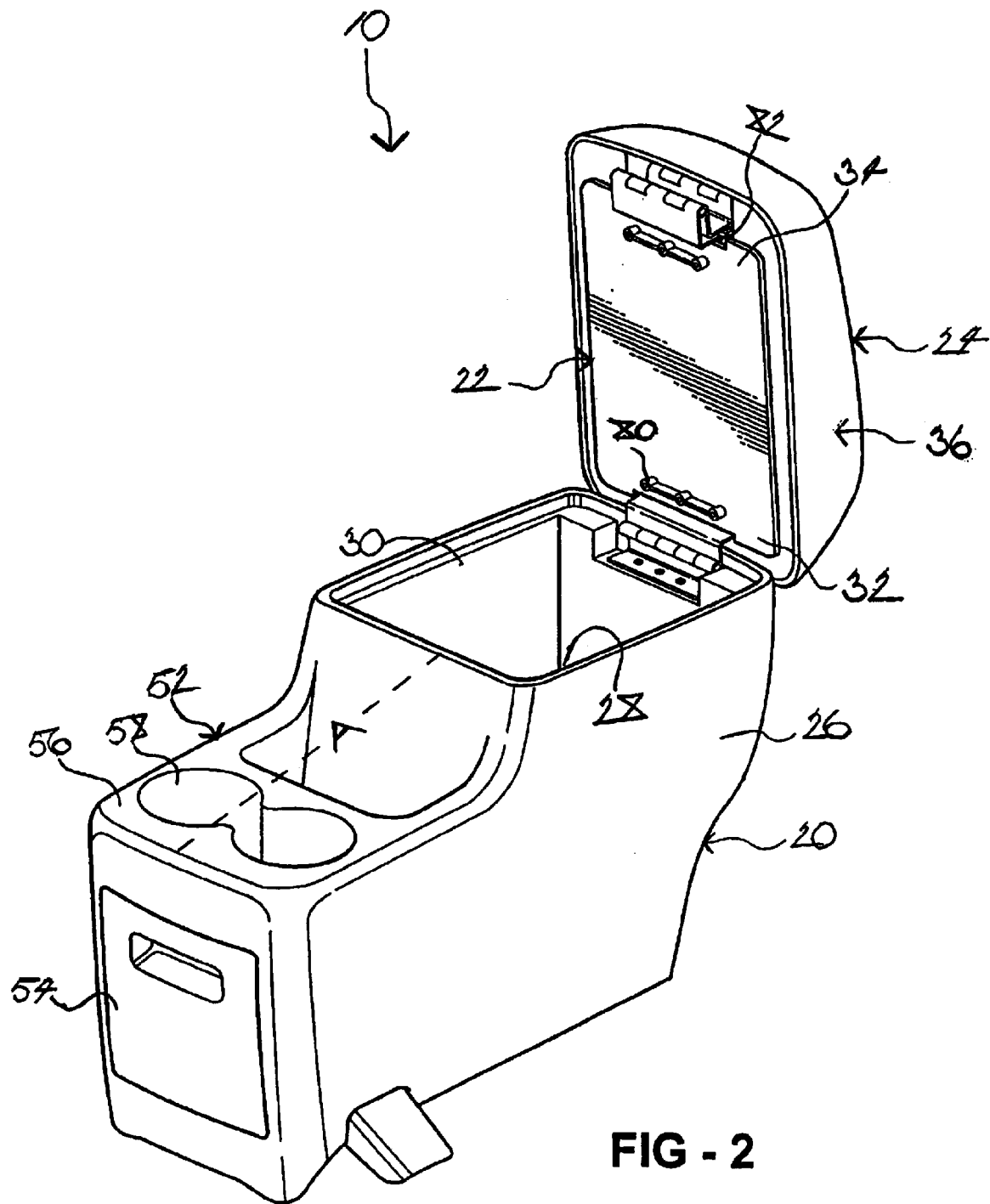
FIG. 2 is a perspective view of the console system of the present invention showing the console component in an opened disposition.

Similarly and as shown in FIGS. 2 and 3, the first end 32 of the plate 22 includes a first mounting area 80, such as a plurality of holes 80, to engage the first hinge 72. More specifically, the first hinge 72 is screwed or bolted into the bottom surface 66 of the plate 22 via the first mounting area 80. As shown in FIG. 6, this engagement allows the plate 22 to rotate about an axis defined at the pivot point 78 extending substantially perpendicular with respect to the page of the figure and upward and downward in an arcing manner relative to the console component 20. Thus, the plate 22 is pivotable at the first end 32 between the first position, wherein the plate 22 covers the opening 30 of the console component 20, and the second position, wherein the plate 22 is spaced from the opening 30 to allow access to the interior 28 of the console component 20.

Figure 9:
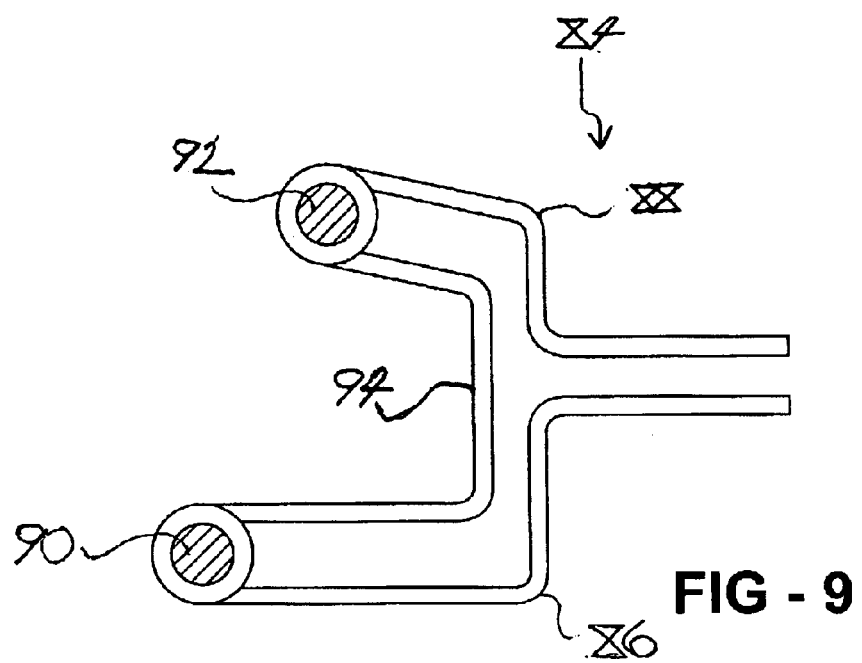
FIG. 9 is an elevational side view of the second hinge of the console system of the present invention.

Preferably and as shown in FIGS. 2 and 3, the second end 34 of the plate 22 includes a second mounting area 82, such as a plurality of holes 82, to enable a second hinge, generally indicated at 84 and shown per se in FIG. 9, to be mounted on the plate 22. More specifically and as shown in FIGS. 5, 6, 7, and 10, the second hinge 84 includes a first leg 86 mounted to the second end 34 of the plate 22, a second leg 88 mounted to the inner surface 38 of the lid 24. A first pivot point 90 is operatively connected to the first leg 86, and a second pivot point 92 operatively connected to the second leg 88 with a U-shaped portion 94 extending between the first and second pivot points 90, 92, respectively.

Preferably and as shown in FIG. 3, on the inner surface 38 of the lid 24, a mounting area 96, such as a plurality of holes 96, is provided to engage the second hinge 84. More specifically, the second hinge 84 is screwed or bolted into the inner surface 38 of the lid 24 via the mounting area 96. This engagement allows the lid 24 to rotate upward and downward in an arcing manner relative to the plate 22. The second hinge 84 is operable to pivot about the first pivot point 90 such that the lid 24 is movable between the first position, wherein the inner surface 38 of the lid 24 is juxtaposed the plate 22 (FIG. 5), to an intermediate position, wherein the inner surface 38 is disposed substantially 90° relative to the plate 22 (FIG. 2). The second hinge 84 is further operable to pivot about the second pivot point 92 such that the inner surface 38 is movable between the intermediate position and the second position, wherein the inner surface 38 and the plate 22 define a co-extensive, substantially planar surface (FIGS. 3, 7 and 10).

The bottom surface 66 of the plate 22 is mounted to the first hinge 72, whereas the top surface 64 of the plate 22 is mounted to the inner surface 38 of the lid 24. In this manner, the lid 24 can rotate relative to the plate 22 without causing the plate 22 to simultaneously rotate. Similarly, the plate 22 can rotate relative to the console component 20 without causing the lid 24 to simultaneously rotate.

Because the lid 24 is able to move independently of the plate 22, it is possible to fully rotate the lid 24 to cause the inner surface 38 to be substantially co-planar with the top surface 64 of the plate 22 to form a substantially flat and elongated load floor on which to place items, such as skis, wood planks, metal strips, and other elongated items or even drinking cups. Furthermore, this configuration blocks access to the interior 28 of the console component 20 because the plate 22 is still in place. Those having ordinary skill in the art will also appreciate that the lid 24 can be provided to rotate relative to the console component 20 in several different directions.

When it is desired to access the interior 28 of the console component 20, the plate 22, in tandem with the lid 24, is rotated away from the console component 20. In this manner, access to the interior 28 of the console component 20 is provided.

In one embodiment of the console system 10 and as best shown in FIG. 10, the console component 20 further includes a bottom surface 98. A portion of the bottom surface has an appendage 100 adapted to engage a surface of the interior compartment 12 of the motor vehicle, such as a rod 102 situated above the floor 14. The appendage 100 is preferably curved and biased to urge upward and against the rod 102 to secure the console component 20 thereto upon installation of the console system 10. During the installation, the console component 20 is slightly tilted, such as about 10 degrees, so that the appendage 100 can engage the rod 102. The console component 20 is then pushed downward so that the appendage 100 is urged downward against the rod 102 until the appendage 100 "snaps" into place.

Additionally, the appendage 100 obviates the need for fastening devices, such as screws and bolts, to secure that portion of the console component 20 to the floor 14. Only the opposed portion of the bottom surface 98 of the console component 20 needs to be secured to the floor 14 with conventional fastening devices 104, such as screws and/or bolts.

Thus, the console system 10 includes a lid 24 that can be selectively positioned to provide a substantially flat and elongated surface for placing various items thereon. While the lid 24 is positioned in this way, the plate 22 serves to simultaneously prevent access to the interior 28 of the console component 20. On the other hand, the plate 22 can also be selectively positioned to provide access to the interior 28 of the console component 20. In addition, the console system 10 can be provided with an appendage 100 that is adapted to engage a surface of the motor vehicle to secure that portion of the console component 20 to the interior 12 of the motor vehicle without the need for any additional fastening devices.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A console system for the interior of a motor vehicle, said console system comprising:

a console component defining a housing having an interior with an opening and a longitudinal axis;

a plate having first and second ends, said plate supported on said console component and pivotably movable at said first end of said plate relative to said console component between a first position, wherein said plate covers said opening of said console component, and a second position, wherein said plate is spaced from said opening to allow access to said interior of said console component;

a lid having a cover and an inner surface, said lid supported by said plate and pivotably movable at said second end of said plate between a first position, wherein said inner surface of said lid is juxtaposed said plate, and a second position, wherein said inner surface is spaced from said plate such that said inner surface and said plate define a co-extensive, substantially planar surface along said longitudinal axis of said console component; and a hinge including a first leg mounted to said second end of said plate, a second leg mounted to said inner surface of said lid, a first pivot point operatively connected to said first leg, and a second pivot point operatively connected to said second leg with a U-shaped portion extending between said first and second pivot points, said hinge operable to pivot about said first pivot point such that said lid is movable between said first position wherein said inner surface of said lid is juxtaposed said plate to an intermediate position wherein said inner surface is disposed substantially 90° relative to said plate, said hinge further operable to pivot about said second pivot point such that said inner surface is movable between said intermediate position and said second position wherein said inner surface and said plate define the co-extensive, substantially planar surface.

2. A console system as set forth in claim 1, wherein said console system further includes a first hinge having a first leg mounted to said console component, a second leg mounted to said first end of said plate, and a pivot point operatively connected to said first and second legs of said first hinge such that said plate is pivotable at said first end between said first and second positions.

3. A console system as set forth in claim 1, wherein said lid includes a core formed between said cover and said inner surface, said inner surface of said lid including at least one open-ended cavity defined in said inner surface for accepting and retaining articles when said lid is in said second position.

4. A console system as set forth in claim 1, wherein said console component includes a forward portion spaced vertically below said opening of said console component, said forward portion including at least one receptacle defined therein for retaining articles in said forward portion.

5. A console system as set forth in claim 4, wherein said forward portion includes a drawer for storing items therein and a top cover juxtaposed said drawer and having said at least one receptacle defined therein for retaining articles in said top cover.

6. A console system as set forth in claim 4, wherein said lid is supported by said forward portion of said console component when said lid is disposed in said second position.

7. A console system for the interior of a motor vehicle, said console system comprising:

a console component defining a housing having an interior with an opening and a longitudinal axis;

a plate having first and second ends, said plate supported on said console component and pivotably movable at said first end of said plate relative to said console component between a first position, wherein said plate covers said opening of said console component, and a second position, wherein said plate is spaced from said opening to allow access to said interior of said console component;

a lid having a cover and an inner surface, said lid supported by said plate and pivotably movable at said second end of said plate between a first position, wherein said inner surface of said lid is juxtaposed said plate, and a second position, wherein said inner surface is spaced from said plate such that said inner surface and said plate define a co-extensive, substantially planar surface along said longitudinal axis of said console component;

a first hinge having a first leg mounted to said console component, a second leg mounted to said first end of said plate, and a pivot point operatively connected to said first and second legs of said first hinge such that said plate is pivotable at said first end between said first and second positions; and a second hinge including a first leg mounted to said second end of said plate, a second leg mounted to said inner surface of said lid, a first pivot point operatively connected to said first leg, and a second pivot point operatively connected to said second leg with a U-shaped portion extending between said first and second pivot points, said second hinge operable to pivot about said first pivot point such that said lid is movable between said first position wherein said inner surface of said lid is juxtaposed said plate to an intermediate position wherein said inner surface is disposed substantially 90° relative to said plate, said second hinge further operable to pivot about said second pivot point such that said inner surface is movable between said intermediate position and said second position wherein said inner surface and said plate define the co-extensive, substantially planar surface.

8. A console system as set forth in claim 7, wherein said lid includes a core formed between said cover and said inner surface, said inner surface of said lid including at least one open-ended cavity defined in said inner surface for accepting and retaining articles when said lid is in said second position.

9. A console system as set forth in claim 7, wherein said console component includes a forward portion spaced vertically below said opening of said console component, said forward portion including at least one receptacle defined therein for retaining articles in said forward portion.

10. A console system as set forth in claim 9, wherein said forward portion includes a drawer for storing items therein and a top cover disposed immediately adjacent said drawer and having said at least one receptacle defined therein for retaining articles in said top cover.

11. A console system as set forth in claim 9, wherein said lid is supported by said forward portion of said console component when said lid is disposed in said second position.

12. A console system as set forth in claim 7, wherein said console component further includes a bottom surface having an appendage adapted to engage a surface of the interior of the motor vehicle to prevent or lessen vertical movement of said console component upon installation of said console system within the interior of the motor vehicle.

13. A console system as set forth in claim 12, wherein said appendage is curved and biased to urge up and against the surface of the interior of the motor vehicle.

14. A console system for the interior of a motor vehicle, said console system comprising:

a console component defining a housing having an interior with an opening and a longitudinal axis;

a plate having first and second ends, said plate supported on said console component and pivotably movable at said first end of said plate relative to said console component between a first position, wherein said plate covers said opening of said console component, and a second position, wherein said plate is spaced from said opening to allow access to said interior of said console component;

a lid having a cover and an inner surface, said lid supported by said plate and pivotably movable at said second end of said plate between a first position, wherein said inner surface of said lid is juxtaposed said plate, and a second position, wherein said inner surface is spaced from said plate such that said inner surface and said plate define a co-extensive, substantially planar surface along said longitudinal axis of said console component; and wherein said console component further includes a bottom surface having an appendage adapted to engage a surface of the interior of the motor vehicle to secure said console component relative thereto upon installation of said console system.

15. A console system as set forth in claim 14, wherein said appendage is curved and biased to urge upward and against the surface of the interior of the motor vehicle.

16. A console system as set forth in claim 14, wherein said console system further includes a first hinge having a first leg mounted to said console component, a second leg mounted to said first end of said plate, and a pivot point operatively connected to said first and second legs of said first hinge such that said plate is pivotable at said first end between said first and second positions.

17. A console system as set forth in claim 14, wherein said console system further includes a second hinge including a first leg mounted to said second end of said plate, a second leg mounted to said inner surface of said lid, a first pivot point operatively connected to said first leg, and a second pivot point operatively connected to said second leg with a U-shaped portion extending between said first and second pivot points, said second hinge operable to pivot about said first pivot point such that said lid is movable between said first position wherein said inner surface of said lid is juxtaposed said plate to an intermediate position wherein said inner surface is disposed substantially 90° relative to said plate, said second hinge further operable to pivot about said second pivot point such that said inner surface is movable between said intermediate position and said second position wherein said inner surface and said plate define the co-extensive, substantially planar surface.

\* \* \* \* \*